United States Patent
Ichikawa et al.

(10) Patent No.: US 7,618,476 B2
(45) Date of Patent: Nov. 17, 2009

(54) METHOD AND APPARATUS FOR COOLING REDUCED-IRON AGGLOMERATE

(75) Inventors: Hiroshi Ichikawa, Kitakyushu (JP); Yasushi Ohba, Kitakyushu (JP); Shiro Ohara, Kitakyushu (JP); Yukio Kowaki, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 33 days.

(21) Appl. No.: 10/489,996

(22) PCT Filed: Sep. 19, 2002

(86) PCT No.: PCT/JP02/09627

§ 371 (c)(1),
(2), (4) Date: Mar. 18, 2004

(87) PCT Pub. No.: WO03/027333

PCT Pub. Date: Apr. 3, 2003

(65) Prior Publication Data

US 2004/0262822 A1 Dec. 30, 2004

(30) Foreign Application Priority Data

| Sep. 19, 2001 | (JP) | ............................. 2001-285978 |
| Sep. 27, 2001 | (JP) | ............................. 2001-295686 |
| Sep. 27, 2001 | (JP) | ............................. 2001-295782 |
| Aug. 1, 2002 | (JP) | ............................. 2002-225233 |

(51) Int. Cl.
*C21B 11/00* (2006.01)
*C22B 1/26* (2006.01)

(52) U.S. Cl. ........................................................ 75/484

(58) Field of Classification Search ................... 75/484, 75/479; 266/177; 198/952, 860.3; 419/25
See application file for complete search history.

(56) References Cited

U.S. PATENT DOCUMENTS 1,492,818 A * 5/1924 Thornhill ...................... 75/487

(Continued)

FOREIGN PATENT DOCUMENTS

JP 6-316718 A 11/1994

(Continued)

OTHER PUBLICATIONS

Marks' Standard Handbook for Mechanical Engineers, 9$^{th}$ Edition, 1987, p. 10-50.*

(Continued)

*Primary Examiner*—George Wyszomierski
*Assistant Examiner*—Mark L Shevin
(74) *Attorney, Agent, or Firm*—Kenyon & Kenyon LLP

(57) ABSTRACT

In a method and an apparatus for cooling a reduced-iron agglomerate in a reduced-iron agglomerate production equipment wherein an iron oxide agglomerate is reduced in a reducing furnace and discharged as a reduced-iron agglomerate, a conveyer to convey said reduced-iron agglomerate is installed at the outlet of said reduced-iron agglomerate production equipment, a plurality of spray nozzles are installed above, or above and below, said conveyer at intervals in the conveying direction of said reduced-iron agglomerate, and said reduced-iron agglomerate on said conveyer is cooled intermittently by ejecting cooling water, continuously or intermittently, through said spray nozzles.

1 Claim, 9 Drawing Sheets

U.S. PATENT DOCUMENTS

| | | | | |
|---|---|---|---|---|
| 1,871,863 | A * | 8/1932 | Stansfield | 266/138 |
| 2,767,076 | A * | 10/1956 | Taylor | 75/495 |
| 3,036,440 | A | 5/1962 | Feinman | |
| 3,754,890 | A * | 8/1973 | Fitch | 75/10.67 |
| 4,033,559 | A | 7/1977 | Pietsch | |
| 4,165,978 | A | 8/1979 | Sanzenbacher et al. | |
| 5,930,579 | A * | 7/1999 | Nagumo et al. | 419/2 |
| 6,048,381 | A * | 4/2000 | Kepplinger et al. | 75/436 |
| 6,241,803 | B1 * | 6/2001 | Fuji | 75/425 |
| 6,652,620 | B2 * | 11/2003 | Miyagawa et al. | 75/430 |
| 6,652,802 | B2 * | 11/2003 | Sherwood | 266/173 |
| 2002/0053307 | A1 * | 5/2002 | Ishiwata et al. | 110/341 |
| 2003/0019548 | A1 | 1/2003 | Miyagawa et al. | |
| 2004/0168550 | A1 * | 9/2004 | Tsuge et al. | 75/503 |

FOREIGN PATENT DOCUMENTS

| | | |
|---|---|---|
| JP | 6-316718 A | 11/1994 |
| JP | 2000-212651 A | 8/2000 |
| WO | WO 96/23081 | 8/1996 |

OTHER PUBLICATIONS

Supplemental European Search Report dated May 20, 2008 issued in corresponding European Patent Application No. 02 77 2866.

* cited by examiner

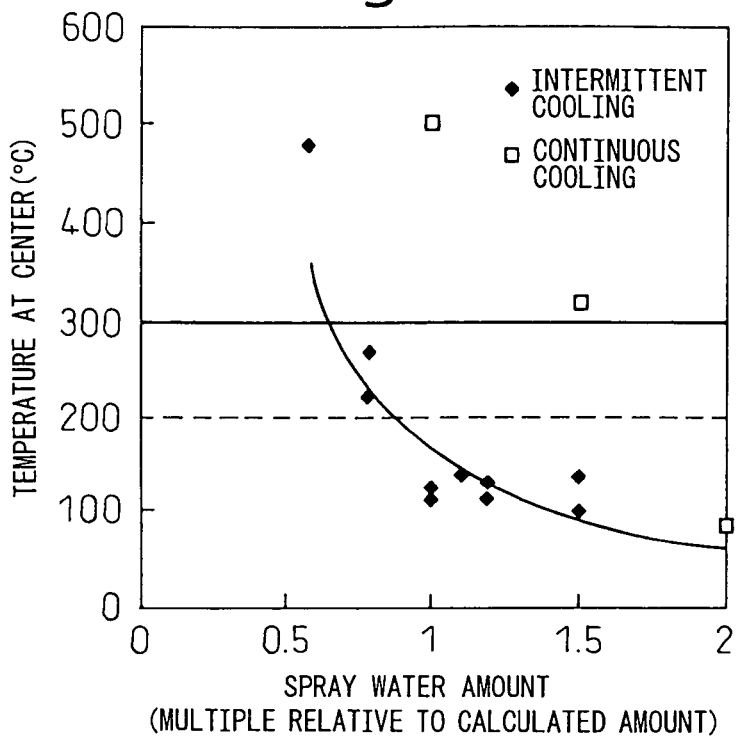
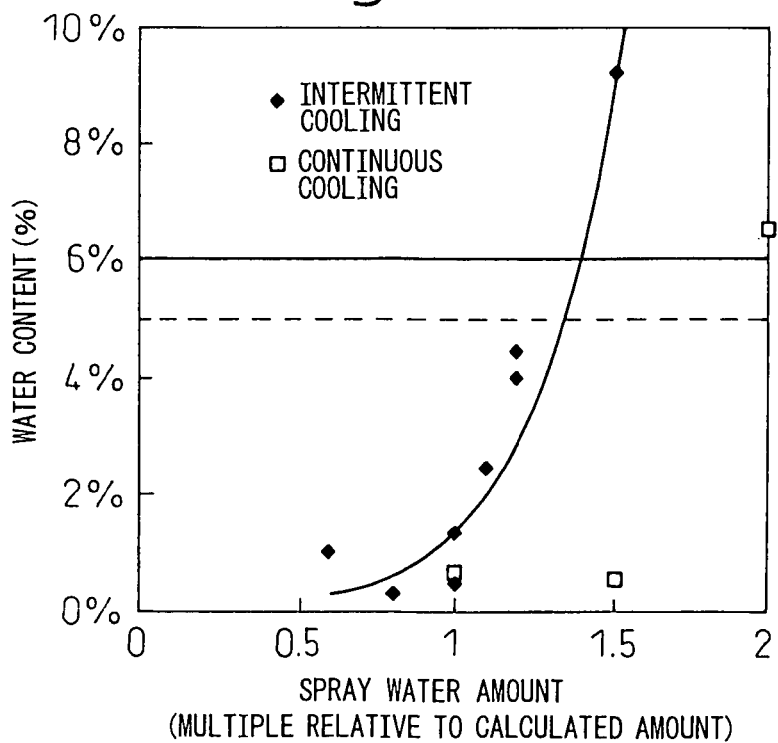

METHOD AND APPARATUS FOR COOLING REDUCED-IRON AGGLOMERATE

TECHNICAL FIELD

The present invention relates to a method and an apparatus for cooling a high-temperature reduced-iron agglomerate that is reduced in, and discharged continuously from, a reducing furnace, in reduced-iron production equipment, to produce a reduced-iron agglomerate from an iron oxide agglomerate.

Here, the above method and apparatus include, for example, a method and an apparatus for cooling a reduced-iron agglomerate produced in a rotary hearth furnace, for reduction, wherein a reduced iron is produced by processing dust and sludge containing metallic oxide generated in the metal refining industry and the metal processing industry.

BACKGROUND ART

As a method for cooling a reduced-iron agglomerate discharged from a reduced-iron production equipment, a method has heretofore been put into practical use wherein a reduced-iron agglomerate is immersed and cooled in a water bath, thereafter taken out from the water bath with a conveyer, discharged directly to an earth floor and stored in stacks, and then, according to circumstances, conveyed and charged into an electric arc furnace.

However, the reduced-iron agglomerate produced by this immersing and cooling method has a high water content and, when it is charged directly into molten metal, there is the danger of a water vapor explosion. Therefore, it has been used only for charging into an electric arc furnace. Moreover, the reduced-iron agglomerate has the problems of pulverization and reoxidation.

Japanese Patent No. 3145834 discloses a method for producing reduced-iron briquettes wherein reduced iron produced by a direct reduction ironmaking method is formed into briquettes by a briquette machine and the reduced-iron briquettes are cooled slowly, at a cooling rate of 150 to 250° C./min., with a water spray.

However, this method is a method wherein high-temperature reduced-iron briquettes are cooled slowly with a water spray in order to suppress cracking of the reduced-iron briquettes and not a method wherein a reduced-iron agglomerate discharged from a reduced-iron production equipment, such as a rotary hearth furnace, is cooled. Moreover, this method does not take an appropriate water content of the reduced-iron agglomerate into consideration.

Further, Japanese Patent No. 3009661 discloses a method wherein high-temperature reduced-iron briquettes having been heated and reduced are cooled with water so that an average cooling rate may be in the range from 1,500 to 500° C./min. during the time when the surface temperature decreases from 650° C. to 150° C.

However, this method is one that is related to the cooling of reduced-iron pellets that are different in size and features from an agglomerate such as briquettes as intended in the present invention. Therefore, this method cannot be applied as it is.

In addition, though the temperature of a reduced-iron agglomerate discharged from a rotary hearth furnace is about 1,000° C., the patent describes neither a cooling method and a cooling rate in the temperature above 650° C. nor a concrete cooling means even in the temperature below 650° C., and further pays no attention at all to the water content of agglomerate.

SUMMARY OF THE INVENTION

The object of the present invention is, by solving the aforementioned problems of prior art, to provide a cooling method and a cooling apparatus for regulating the temperature at the center, and the water content, of a reduced-iron agglomerate to appropriate ranges and also to provide the following concrete means for solving the technological problems: to suppress the reoxidation of a reduced-iron agglomerate caused by the atmospheric air by means of rapidly cooling the reduced-iron agglomerate, at about 1,000° C., discharged from a reduced-iron production equipment such as a rotary hearth furnace to a temperature below 300° C.; to make it possible to charge the reduced-iron agglomerate into molten metal, to decrease the water evaporation energy during melting by means of controlling the water content of the reduced-iron agglomerate after the cooling to 6% or less; and to suppress the pulverization and the reoxidation of the reduced-iron agglomerate by means of optimizing a cooling time.

The present invention solves the aforementioned problems and the gist of the present invention is as follows;

(1) A method for cooling a reduced-iron agglomerate in a reduced-iron agglomerate production equipment wherein an iron oxide agglomerate is reduced in a reducing furnace and discharged as a reduced-iron agglomerate characterized by:

installing a conveyer to convey said reduced-iron agglomerate at the outlet of said reduced-iron agglomerate production equipment;

installing a plurality of spray nozzles above or above and below said conveyer at intervals in the conveying direction of said reduced-iron agglomerate; and cooling said reduced-iron agglomerate on said conveyer intermittently by ejecting cooling water continuously through said spray nozzles.

(2) A method for cooling a reduced-iron agglomerate in a reduced-iron agglomerate production equipment wherein an iron oxide agglomerate is reduced in a reducing furnace and discharged as a reduced-iron agglomerate characterized by:

installing a conveyer to convey said reduced-iron agglomerate at the outlet of said reduced-iron agglomerate production equipment;

installing a plurality of spray nozzles above or above and below said conveyer at intervals in the conveying direction of said reduced-iron agglomerate; and cooling said reduced-iron agglomerate on said conveyer intermittently by ejecting cooling water intermittently through said spray nozzles so that an ejecting time T1 and an ejection stopping time T2 may satisfy the following expression (1), $$1.2 \times T1 \leq T1 + T2 \leq 10 \times T1 \quad (1),$$

where, T1 is an ejecting time and T2 an ejection stopping time.

(3) A method for cooling a reduced-iron agglomerate in a reduced-iron agglomerate production equipment wherein an iron oxide agglomerate is reduced in a reducing furnace and discharged as a reduced-iron agglomerate characterized by:

installing a conveyer to convey said reduced-iron agglomerate at the outlet of said reduced-iron agglomerate production equipment;

installing a plurality of spray nozzles above said conveyer;

spraying cooling water through said spray nozzles on said reduced-iron agglomerate on said conveyer; and accumulating said cooling water so as to form a water layer 1 mm to less than 10 mm, in depth, on said conveyer.

(4) An apparatus for cooling a reduced-iron agglomerate in a reduced-iron agglomerate production equipment wherein an iron oxide agglomerate is reduced in a reducing furnace and discharged as a reduced-iron agglomerate characterized by:
   a conveyer to convey said reduced-iron agglomerate at the outlet of said reduced-iron agglomerate production equipment; and
   a plurality of spray nozzles above or above and below said conveyer at the intervals of P, satisfying the following expression (2), in the conveying direction of said reduced-iron agglomerate in order to cool said reduced-iron agglomerate on said conveyer intermittently by ejecting cooling water continuously through said spray nozzles, $$1.2 \times B \leqq P \leqq 10 \times B \quad (2),$$

where, B is the spread width of cooling water in the conveying direction and P is the intervals of installed spray nozzles.

(5) An apparatus for cooling a reduced-iron agglomerate in a reduced-iron agglomerate production equipment wherein an iron oxide agglomerate is reduced in a reducing furnace and discharged as a reduced-iron agglomerate characterized by:
   a conveyer to convey said reduced-iron agglomerate at the outlet of said reduced-iron agglomerate production equipment; and
   a plurality of spray nozzles above or above and below, said conveyer at intervals in the conveying direction of said reduced-iron agglomerate and setting the spread width of cooling water in the conveying direction B and the spread width thereof in the conveyer width direction W so as to satisfy the following expression (3) in order to cool said reduced-iron agglomerate on said conveyer intermittently by ejecting said cooling water through said spray nozzles, $$W \geqq 2 \times B \quad (3),$$

where, W is the spread width of cooling water in the conveyer width direction and B is the same in the conveying direction.

(6) An apparatus for cooling a reduced-iron agglomerate in a reduced-iron agglomerate production equipment wherein an iron oxide agglomerate is reduced in a reducing furnace and discharged as a reduced-iron agglomerate characterized by:
   a conveyer to convey said reduced-iron agglomerate at the outlet of said reduced-iron agglomerate production equipment; and
   a plurality of spray nozzles above, or above and below, said conveyer at the intervals of P, satisfying the following expression (4), in the conveying direction of said reduced-iron agglomerate in order to cool said reduced-iron agglomerate on said conveyer intermittently by ejecting cooling water intermittently through said spray nozzles, $$B \leqq P \quad (4),$$

where, B is the spread width of cooling water in the conveying direction and P is the intervals of installed spray nozzles.

(7) An apparatus for cooling a reduced-iron agglomerate according to the item (6), characterized in that said spread width of cooling water in the conveying direction B and said spread width thereof in the conveyer width direction w satisfy the following expression (3), $$W \geqq 2 \times B \quad (3),$$

where, w is the spread width of cooling water in the conveyer width direction and B is the same in the conveying direction.

(8) An apparatus for cooling a reduced-iron agglomerate according to any one of the items (4) to (7), characterized in that said spread width of cooling water in the conveyer width direction W and the width of said conveyer CW satisfy the following expression (5), $$CW \leqq W \quad (5),$$

where, CW is the width of a conveyer and W is the spread width of cooling water in the conveyer width direction.

(9) An apparatus for cooling a reduced-iron agglomerate in a reduced-iron agglomerate production equipment wherein an iron oxide agglomerate is reduced in a reducing furnace and discharged as a reduced-iron agglomerate characterized by:
   a conveyer to convey said reduced-iron agglomerate at the outlet of said reduced-iron agglomerate production equipment;
   a plurality of spray nozzles to spray cooling water on said reduced-iron agglomerate above said conveyer; and
   side portions arranged on said conveyer so as to accumulate said cooling water and form a water layer 1 mm to less than 10 mm, in depth, on said conveyer.

BRIEF DESCRIPTION OF THE DRAWINGS

FIG. 6 is a graph showing the relationship between the spray amount of cooling water and the temperature at the center of a reduced-iron agglomerate.

FIG. 7 is a graph showing the relationship between the spray amount of cooling water and the water content of a reduced-iron agglomerate.

THE MOST PREFERRED EMBODIMENT

Figure 1:
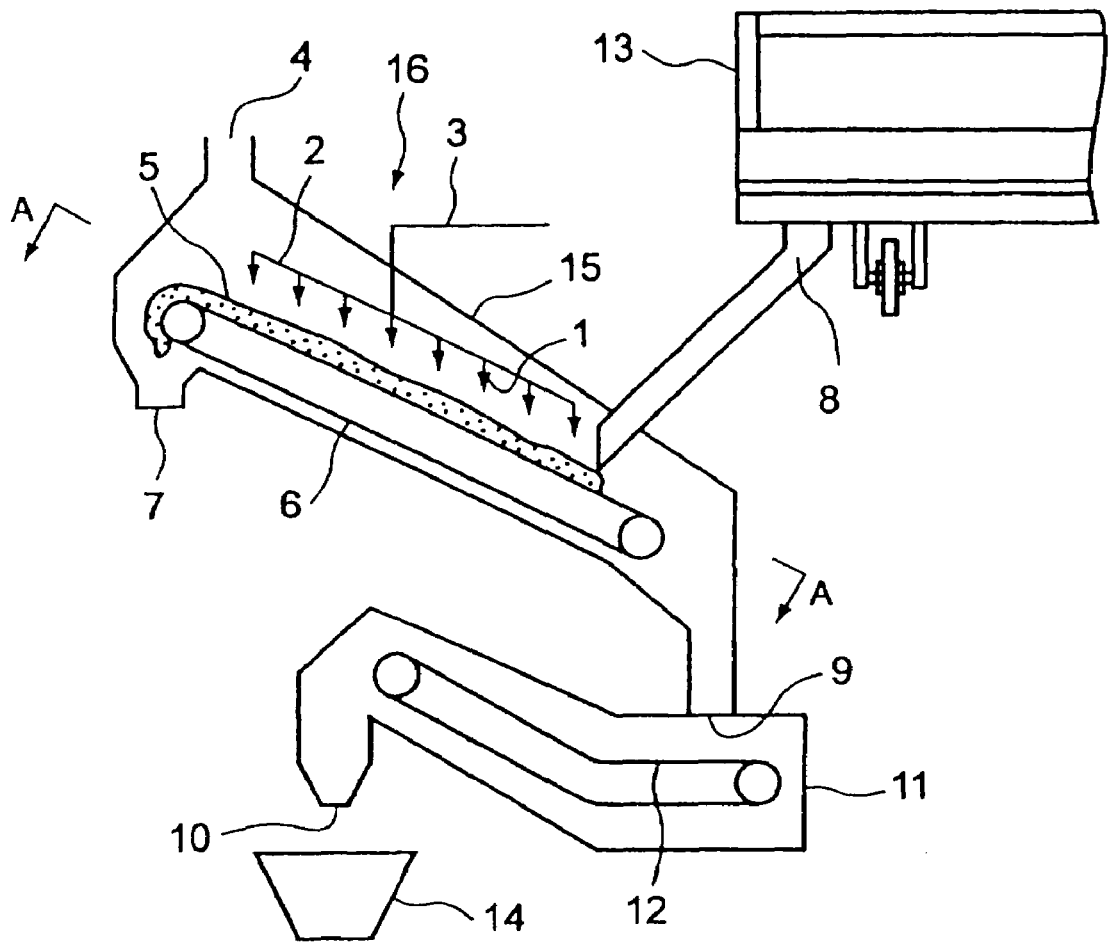
FIG. 1 is a view showing a cooling apparatus according to the present invention.
Figure 2:
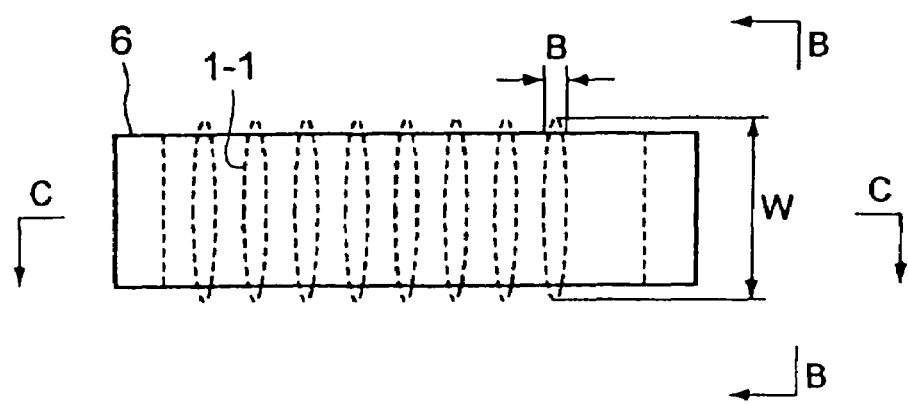
FIG. 2 is a plan view taken on line A-A of FIG. 1.

1) The present invention is explained on the basis of the cooling apparatus shown in FIGS. 1 and 2.

An iron oxide agglomerate is reduced in a rotary hearth furnace 13 used as a reducing furnace and the reduced-iron agglomerate thus produced is discharged continuously from an outlet 8 to discharge the reduced-iron agglomerate. The discharged high-temperature reduced-iron agglomerate 5 is cooled with water sprayed through a plurality of spray nozzles 1 while being conveyed on a conveyer 6 in a cooling apparatus 16 placed in connection with the outlet 8, then discharged from another outlet 7 to discharge the reduced-iron agglomerate, and conveyed to a storage installation, or the like, not shown in the figures.

Each of the spray nozzles 1 is attached at prescribed intervals to a nozzle header 2 installed in parallel with the conveying direction of, and above, the conveyer 6.

The spray nozzles 1, the spray header 2 and the conveyer 6 are covered by a casing 15 and, at the top end of the casing 15, the outlet 7 is placed to discharge the cooled reduced-iron agglomerate 5 and, at the bottom end thereof, the outlet 9 is placed to discharge sludge formed by spraying water on the reduced-iron agglomerate 5.

FIG. 2 shows a plan view taken on line A-A of FIG. 1 from above the conveyer 6 and the cooling water sprayed through each of the spray nozzles 1 (hereunder referred to as "cooling water" or "spray water" in some cases) is sprayed at intervals so as to form a spread width of cooling water in the conveying direction "B" as shown by the spray range 1-1.

Figure 3:
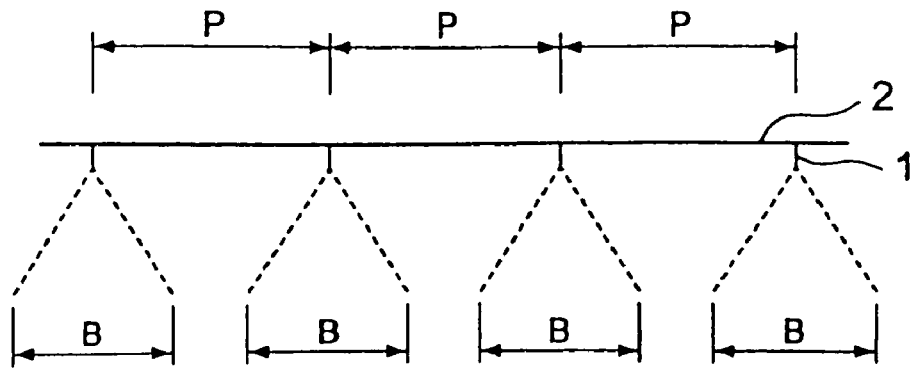
FIG. 3 is an expanded sectional view being taken on line C-C of FIG. 2 and showing an example of water spray according to the present invention.

FIG. 3 is an expanded sectional view taken on line C-C of FIG. 2. In the figure, each of the spray nozzles 1 is attached to the spray header 2 at intervals "P" in the conveying direction and spray water is sprayed at intervals on the conveyer 6 so as to form the spread width of cooling water in the conveying direction "B".

Figure 4:
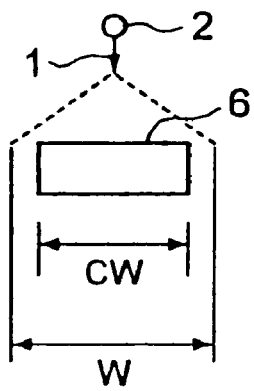
FIG. 4 is a front view taken on line B-B of FIG. 2.

FIG. 4 shows a front view taken on line B-B of FIG. 2. In the figure, a spray nozzle 1 is attached to the spray header 2 disposed in the center of the width direction of the conveyer 6 and spray water is sprayed on the conveyer 6 so as to form the spread width in the width direction "W" that is larger than the width of the conveyer 6 "CW".

Figure 5:
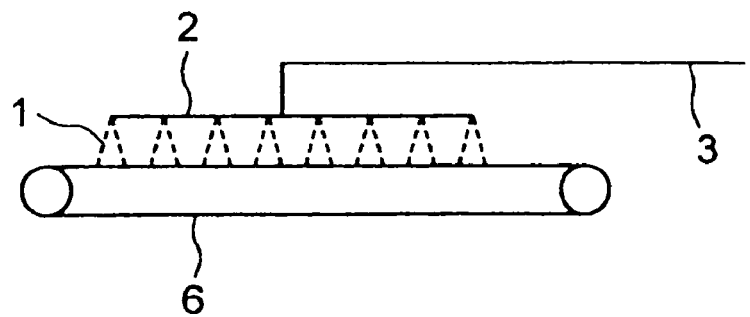
FIG. 5 is a view showing an example of spray nozzles according to the present invention.

Water is supplied to the spray header 2 through a feed water pipe 3 as shown in FIG. 5.

As explained above, a cooling apparatus according to the present invention is an apparatus that intermittently cools a reduced-iron agglomerate 5 on a conveyer 6 by installing a plurality of spray nozzles 1 above the conveyer 6 at intervals in the conveying direction of the reduced-iron agglomerate 5 and ejecting spray water continuously through each of the spray nozzles. The condition that assures intermittent cooling is "B<P" as it is understood from FIG. 3.

Figure 10:
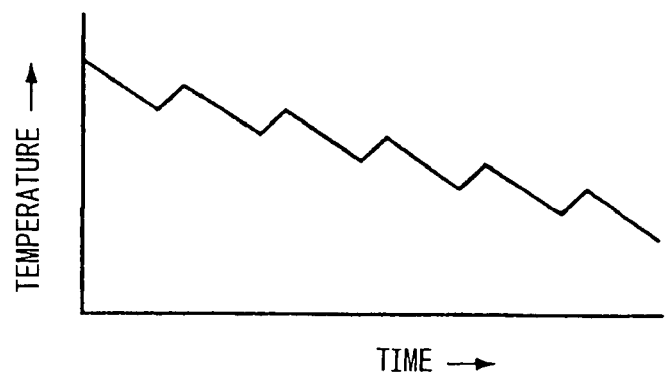
FIG. 10 is a graph showing an example of the temperature change of agglomerate according to the present invention.

By intermittent cooling, the surface temperature of a reduced-iron agglomerate 5 on a conveyer 6 lowers while changing for example as shown in FIG. 10. That is, the surface of the reduced-iron agglomerate is cooled with spray water ejected through the first spray nozzle 1, thereafter the surface temperature begins to rise due to the internal heat of the reduced-iron agglomerate during the time until the surface is cooled with the next spray water, and the surface temperature rise stops at the time when the temperatures at the inside and the outside of the reduced-iron agglomerate balance with each other.

Then, next cooling is commenced from the balanced temperature with the next spray water. By repeating such steps, the reduced-iron agglomerate 5 is cooled to 100° C. to 300° C. in accordance with such a cooling pattern as shown in FIG. 10. In the case of intermittent cooling, since the temperature of a reduced-iron agglomerate 5 lowers by the giving and receiving of heat in the agglomerate and the forced cooling with spray water supplied from the outside, the unit consumption of water can be reduced in comparison with the case of continuous forced cooling.

The reason why cooling can be accomplished with a small unit consumption of water is presumably that the internal transfer of heat in a reduced-iron agglomerate is faster than that in the case of applying spray water unilaterally from outside.

Further, in the case of the intermittent cooling of the reduced-iron agglomerate, the water sprayed on the surface thereof evaporates and the surface dries due to the rise of the surface temperature between cooling and the subsequent cooling. By repeating such a pattern, the surface of the reduced-iron agglomerate is cooled to a target discharge temperature while water spraying and evaporation are repeated alternately. By so doing, the reduced-iron agglomerate 5 discharged from a cooling apparatus according to the present invention can have a water content of 6% or less.

It is preferable that the water content of a reduced-iron agglomerate is low in order to reduce the energy consumption during melting in an electric arc furnace or the like and a preferable water content is also 6% or less in order to prevent a water vapor explosion at the time when the reduced-iron agglomerate is charged into molten metal.

A preferable temperature of a reduced-iron agglomerate at the time of discharge after cooling is in the range from 100° C. to 300° C. in the present invention. A reduced-iron agglomerate discharged from a rotary hearth furnace at about 1,000° C. is cooled to a temperature in the range from 100° C. to 300° C. by intermittent water spray.

Figure 14:
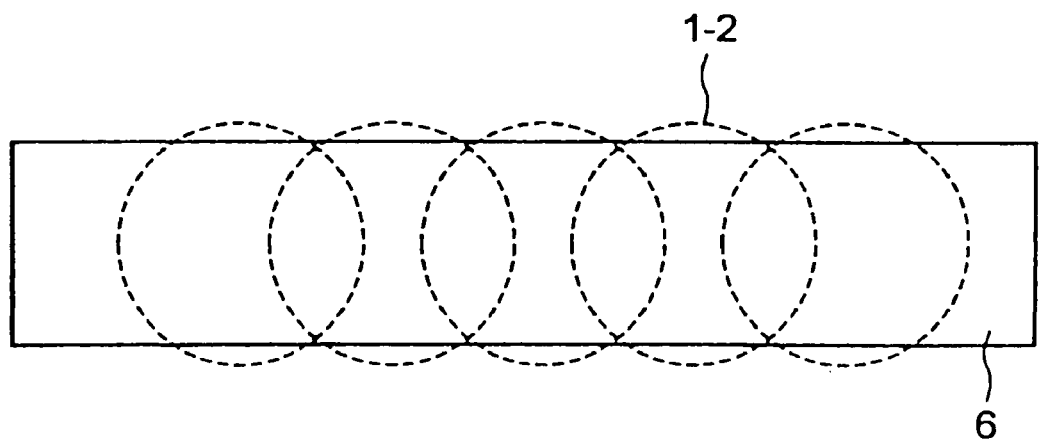
FIG. 14 is a view showing a conventional arrangement of spray nozzles.
Figure 15:
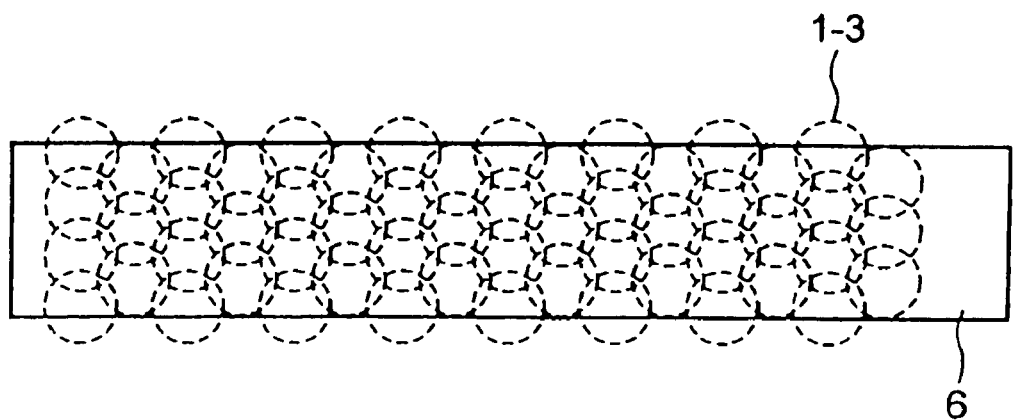
FIG. 15 is a view showing another conventional arrangement of spray nozzles.

In the general arrangement of cooling nozzles, as shown in FIGS. 14 and 15, cone spray nozzles are arranged so that water may be sprayed uniformly over the entire area in the width and conveying directions of a reduced-iron agglomerate.

In this arrangement, the temperature difference between the interior and the surface of a reduced-iron agglomerate (a high temperature at the interior and a low temperature at the surface) increases due to the continuous water spray and a larger amount of water is required in comparison with the intermittent water cooling according to the present invention. When a water amount is increased in order to cool a reduced-iron agglomerate sufficiently in the interior, water remains on the surface that has already been cooled to a low temperature and the water content exceeds 6%.

Further, when cone spray nozzles are used as shown in FIG. 14 or 15, overlaps are formed in the region 1-2 or 1-3 sprayed through each nozzle, the cooling state varies in the direction of the width of a conveyer, and thus the temperature and the water content of a reduced-iron agglomerate also vary.

The first cooling apparatus according to the present invention is configured so that the relation between the spread width of spray water in the conveying direction "B" and the intervals of installed spray nozzles "P" may satisfy the aforementioned expression (2), namely $1.2 \times B \leq P \leq 10 \times B$.

The condition "$1.2 \times B \leq P$" is determined as the condition that makes sure that a sprayed range 1-1 is firmly separated from the sprayed range of an adjacent spray nozzle 1 as shown in FIG. 2, namely the condition for the assurance of intermittent cooling.

The condition "$P \leq 10 \times B$" is determined as the condition that makes sure that the temperature rise caused by the internal heat of a reduced-iron agglomerate is not saturated during the time between cooling and the subsequent cooling and effective cooling is secured.

Next, the second cooling apparatus according to the present invention is configured so that the relation between the spread width of spray water in the conveying direction "B" and the spread width thereof in the conveyer width direction "W" may satisfy the aforementioned expression (3), namely $W \geq 2 \times B$.

Under this condition, by employing, for example, flat spray nozzles that make the sprayed ranges 1-1 flat, the spread width of spray water in the conveying direction "B" is nearly constant in the conveyer width direction, therefore the variation of the cooling state in the conveyer width direction decreases, and resultantly intermittent cooling can be carried out effectively.

Further, the first and second cooling apparatuses according to the present invention are configured so that the relation between the spread width of spray water in the conveyer width direction "W" and the width of the conveyer "CW" may satisfy the aforementioned expression (5), namely $CW \leq W$.

That is, by building up the relation between "W" and "CW" as shown in FIG. 4, it becomes possible to cool a reduced-iron agglomerate on a conveyer 6 uniformly in the conveyer width direction.

In FIG. 1, a reduced-iron agglomerate 5 discharged from a rotary hearth furnace 13 is loaded continuously on a conveyer 6 and conveyed. Spray nozzles 1 are arranged above the conveyer 6 at prescribed intervals in the direction of the conveyer traveling.

Figure 9:
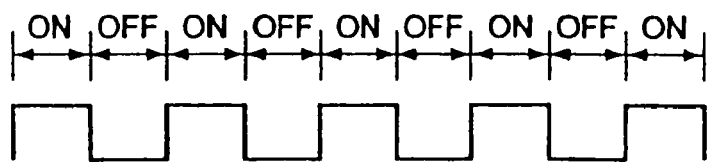
FIG. 9 is a view showing an example of a cooling pattern according to the present invention.

As a result, though water is sprayed continuously through each of the spray nozzles 1, the water is intermittently sprayed on the reduced-iron agglomerate 5 conveyed continuously on the conveyer 6. The cooling pattern of intermittent water spray as viewed from agglomerate is, for example, as shown in FIG. 9, and the time durations of "on" and "off" of the water spray can be adjusted by the relation between "P" and "B".

Figure 11:
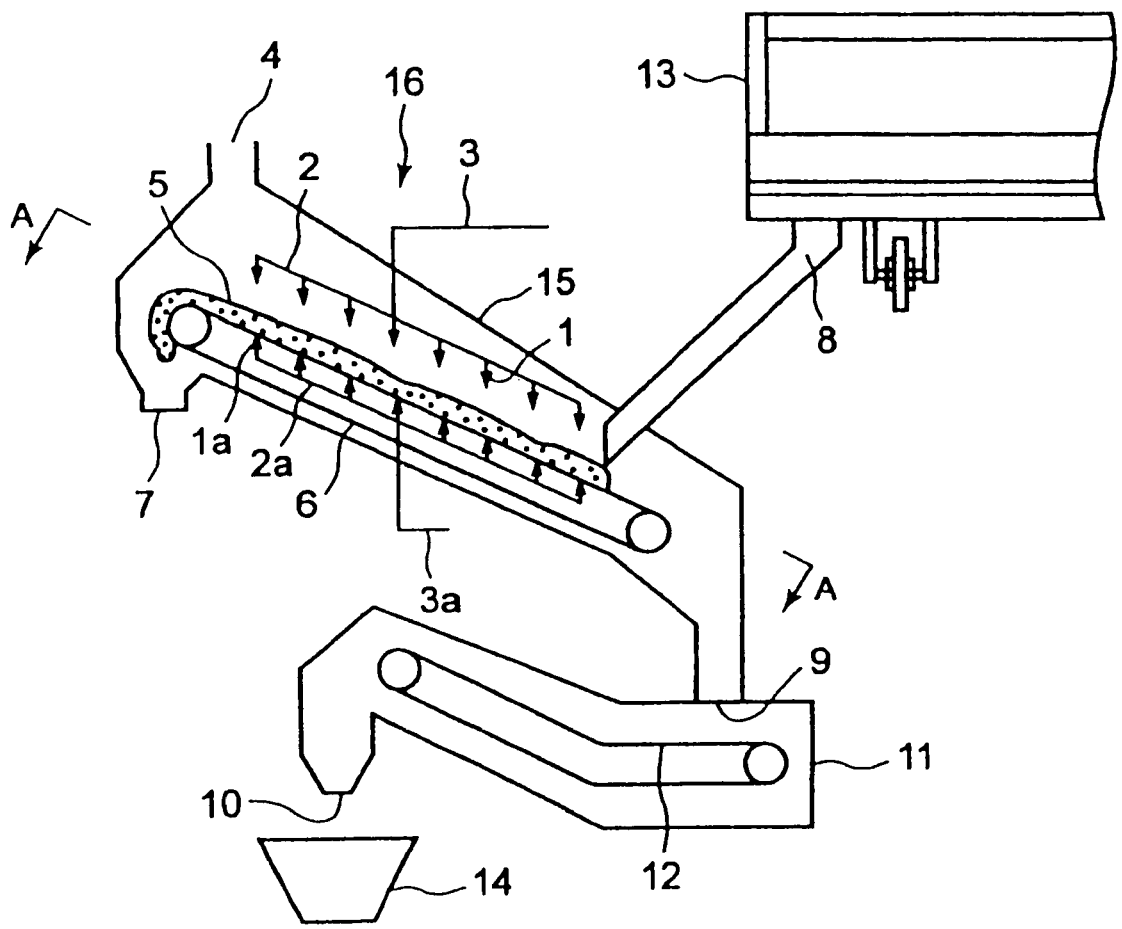
FIG. 11 is a view showing another cooling apparatus according to the present invention wherein spray nozzles are installed above and below a conveyer.

FIG. 11 shows another cooling apparatus according to the present invention. That is, a high-temperature reduced-iron agglomerate 5 reduced in a rotary hearth furnace 13 is fed from an outlet 8 on a conveyer 6 in a cooling apparatus 16 installed in connection with the outlet, cooled with water sprayed through a plurality of upper spray nozzles 1 and lower spray nozzles 1*a* installed above and below the conveyer 6 while being conveyed, and then discharged from a reduced-iron agglomerate outlet 7.

In this way, a high-temperature reduced-iron agglomerate loaded on a conveyer 6 is cooled from top and bottom by a plurality of nozzles 1 and 1*a* installed above and below the conveyer 6. By so doing, it becomes possible to load a reduced-iron agglomerate in plural layers on a conveyer 6 and to improve productivity.

Figure 12:
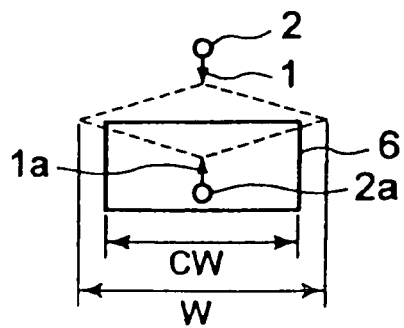
FIG. 12 is a view showing a water spraying situation in the cooling apparatus shown in FIG. 11.
Figure 13:
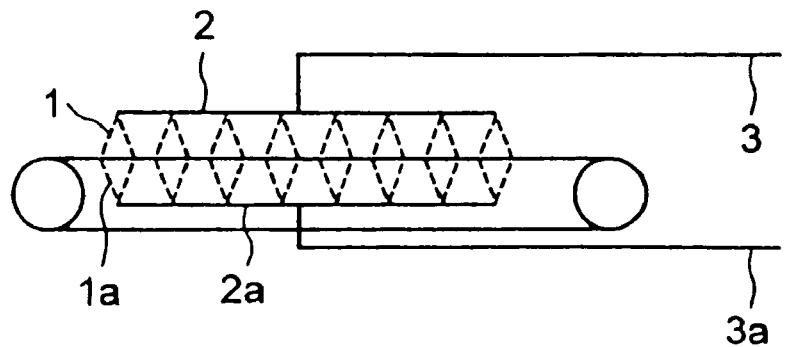
FIG. 13 is a view showing a water supply means in the cooling apparatus shown in FIG. 11.

FIG. 12, like FIG. 4, shows the state of spraying water through spray nozzles 1 and 1*a* installed above and below a conveyer 6 and FIG. 13, like FIG. 5, shows means 2, 2*a*, 3 and 3*a* for supplying water to upper and lower spray nozzles 1 and 1*a*.

As a conveyer 6, a tabular type or a wire-gauze type conveyer is adopted and, in the case where a reduced-iron agglomerate is cooled with nozzles installed above and below a conveyer 6, a cooling efficiency further improves when a wire gauze type conveyer 6 is adopted. Further, with regard to the size of the openings of the wire gauze, any size may be acceptable, as long as a reduced-iron agglomerate does not fall through when it is loaded thereon, but a preferable size of the openings is about 10 mm.

Figure 16:
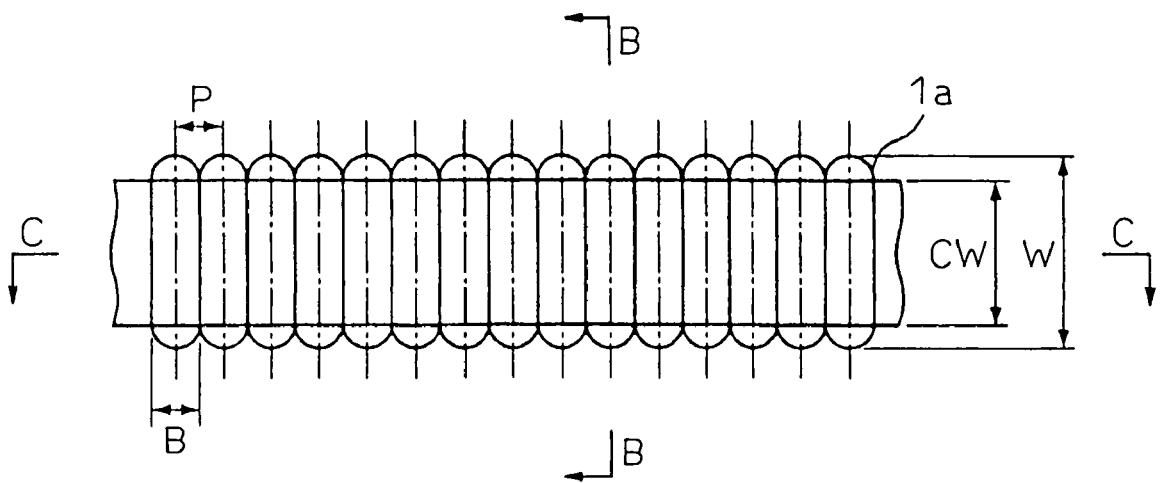
FIG. 16 is a plan view being taken on line A-A of FIG. 1 and showing another embodiment according to the present invention.

Another present invention is explained on the basis of the cooling apparatus shown in FIGS. 1 and 16.

FIG. 16 shows an example of a plan view taken on line A-A of FIG. 1 from above the conveyer 6. In the figure, the intervals "P" of spray nozzles 1 are arranged so that "P" may equal to "B" and water ejected from each of the spray nozzles 1 is sprayed so as to form the spread width in the conveying direction "B" as shown by the spraying range 1*a*. This arrangement makes it possible for the spread widths of spray water in the conveying direction "B" of adjacent nozzles 1 not to overlap with each other.

Figure 17:
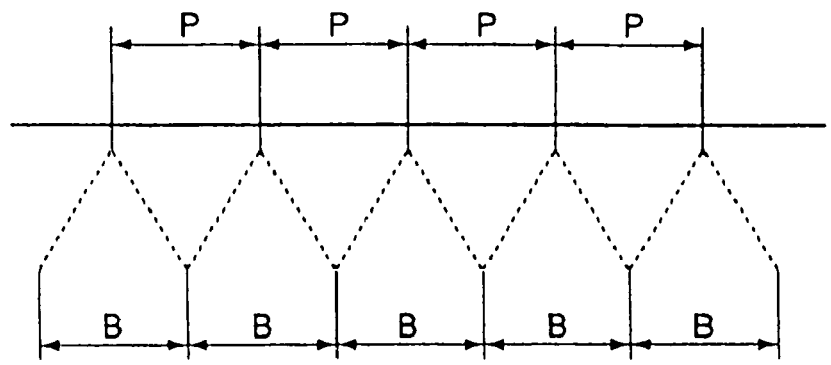
FIG. 17 is an expanded sectional view being taken on line C-C of FIG. 2 and showing another example of water spray according to the present invention.

FIG. 17 is an expanded sectional view taken on line C-C of FIG. 16. In the figure, each of the spray nozzles 1 is attached to a spray header 2 at intervals "P" in the conveying direction and spray water is sprayed on a conveyer 6 so as to form the spread width in the conveying direction "B".

Likewise, FIG. 4 is a front view taken on line B-B of FIG. 16. In the figure, a spray nozzle 1 is attached to the spray header 2 disposed in the center of the width direction of the conveyer 6 and spray water is sprayed on the conveyer 6 so as to form a spread width in the width direction "W" that is larger than the width of the conveyer 6 "CW".

Water is supplied to a spray header 2 through a feed water pipe 3 as shown in FIG. 1.

Figure 18:
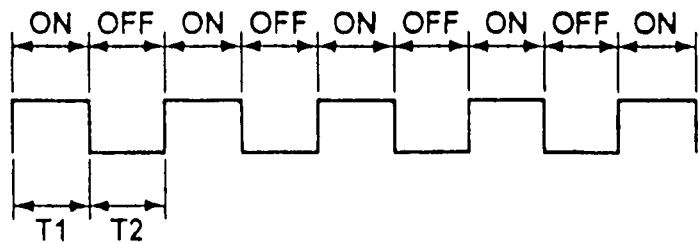
FIG. 18 is a view showing another example of a cooling pattern according to the present invention.

In the present invention, as explained above, a plurality of spray nozzles 1 are installed above a conveyer 6 at prescribed intervals in the conveying direction, of the reduced-iron agglomerate 5, the relation between an ejecting time "T1" and an ejection stopping time "T2" of each of the spray nozzles 1 is arranged to satisfy the expression "$1.2 \times T1 \leq T1 + T2 \leq 10 \times T1$" and the reduced-iron agglomerate 5 on the conveyer is cooled intermittently (on-off) as shown in FIG. 18.

By employing intermittent cooling, the surface temperature of a reduced-iron agglomerate 5 on a conveyer 6 lowers while changing, for example, as shown in FIG. 10. That is, by ejecting water through spray nozzles 1 for a time "T1" and stopping the water ejection for a time "T2", the surface temperature of the reduced-iron agglomerate begins to rise (heat recovery) due to the internal heat of the reduced-iron agglomerate during the ejection stopping time "T2" after cooled with spray water for the time "T1" and the surface temperature rise stops at the time when the temperatures at the inside and the outside of the reduced-iron agglomerate balance with each other.

Then, the next cooling commences, from the balanced temperature, with the next spray water. By repeating such steps, the reduced-iron agglomerate 5 is cooled to 100° C. to 300° C. in accordance with such a cooling pattern as shown in FIG. 10. In the case of intermittent cooling, as the temperature of a reduced-iron agglomerate 5 lowers by the giving and receiving of heat in the agglomerate and the forced cooling with spray water supplied from the outside, the unit consumption of water can be reduced in comparison with the case of continuous forced cooling.

The reason why cooling can be accomplished with a small unit consumption of water is presumably that the internal transfer of heat in the reduced-iron agglomerate is faster than that in the case of applying spray water unilaterally from outside.

Further, in the case of the intermittent cooling of the reduced-iron agglomerate, the water sprayed on the surface thereof evaporates and the surface dries due to the rise of the surface temperature between one cooling and the subsequent cooling. By repeating such a pattern, the surface of the reduced-iron agglomerate is cooled to a target discharge temperature while water spraying and evaporation are repeated alternately. By so doing, the reduced-iron agglomerate 5 discharged from a cooling apparatus according to the present invention can secure a water content of 6% or less.

It is preferable that the water content of a reduced-iron agglomerate is low in order to reduce the energy consumption during melting in an electric arc furnace, or the like, and a preferable water content is also 6% or less in order to prevent water vapor explosion at the time when the reduced-iron agglomerate is charged into molten metal.

As shown in FIGS. 14 and 15, cone spray nozzles are generally used as cooling nozzles and arranged so that the spread of spray water ejected through the cooling nozzles may interfere with each other over the entire area in the width and conveying directions of a reduced-iron agglomerate and thus the spray water may be sprayed on over all the reduced-iron agglomerate.

In this arrangement, the temperature difference between the interior and the surface of a reduced-iron agglomerate (a high temperature at the interior and a low temperature at the surface) increases due to the continuous water spray and a larger amount of water is required in comparison with the intermittent water cooling according to the present invention. When a water amount is increased in order to cool a reduced-iron agglomerate sufficiently up to the interior, water remains on the surface that has already been cooled to a low temperature and the water content exceeds 6%.

Further, when cone spray nozzles are used as shown in FIG. 14 or 15, overlaps are formed in the region 1-2 or 1-3 sprayed through each nozzle, the cooling state varies in the direction of the width of a conveyer, and thus the temperature and the water content of a reduced-iron agglomerate also vary.

Another cooling apparatus according to the present invention is configured so that the relation between an ejecting time "T1" and an ejection stopping time "T2" of spray water may satisfy the expression $$1.2 \times T1 \leq T1+T2 \leq 10 \times T1.$$

That is, the term "$1.2 \times T1 \leq T1+T2$" is the condition for securing intermittent cooling for a shortest time period in order to determine an ejecting time and an ejection stopping time of spray water.

The term "$T1+T2 \leq 10 \times T1$" is the condition for securing effective cooling without the saturation of a temperature rise caused by the internal heat of a reduced-iron agglomerate after cooling.

The third cooling apparatus according to the present invention is configured so that the spread width of spray water in the conveying direction "B" and the intervals of spray nozzles in the conveying direction "P" may satisfy the expression "$B \leq P$". The condition determines the intervals of spray nozzles 1 so that the spread widths of spray water "B" ejected through the spray nozzles 1 may not overlap with each other and, under this condition, uniform cooling is realized.

The fourth cooling apparatus according to the present invention is configured so that the relation between the spread width of spray water in the conveyer width direction "W" and the spread width thereof in the conveying direction "B" may satisfy the expression "$2B \leq W$". Under the condition, a spray region 1a becomes flat as shown in FIG. 16.

For example, when flat spray nozzles are adopted, as the spread width of spray water in the conveying direction "B" becomes nearly constant in the conveyer width direction, the variation of the cooling state in the conveyer width direction decreases and resultantly intermittent cooling can be carried out effectively.

Further, in the aforementioned third cooling apparatus according to the present invention, by configuring the cooling apparatus so that the relation between the spread width of spray water in the conveyer width direction "W" and the conveyer width "CW" may satisfy the expression "$CW \leq W$", namely by building up the relation between "W" and "CW" as shown in FIG. 4, a reduced-iron agglomerate on a conveyer 6 is cooled uniformly in the conveyer width direction.

EXAMPLES

Figure 8:
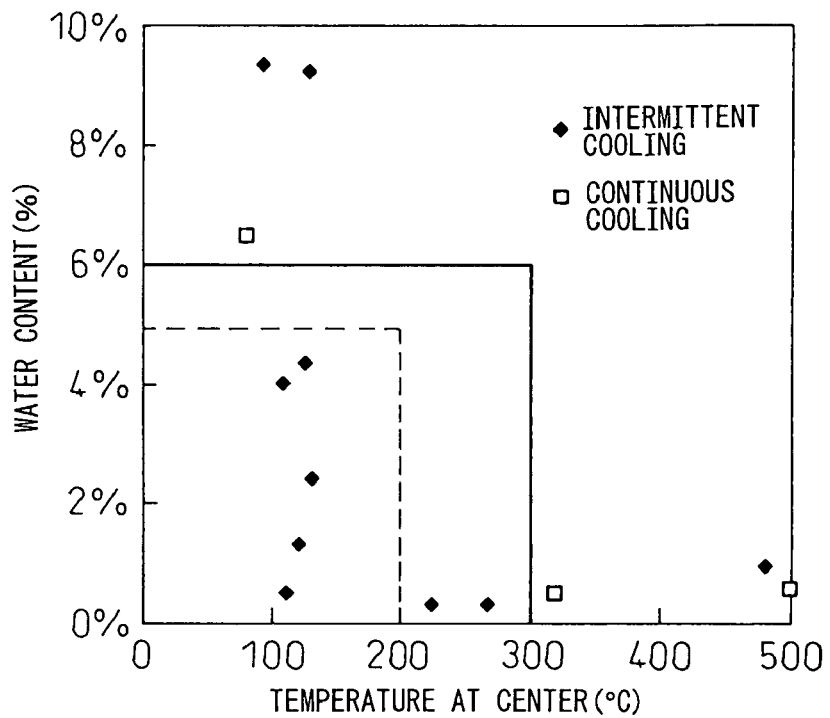
FIG. 8 is a graph showing the relationship between the temperature at the center of a reduced-iron agglomerate and the water content thereof.

Next, the results obtained from the examples of the present invention are shown in FIGS. 6 to 8.

The intermittent cooling of the invention examples was performed under the condition prepared so that the relation between the spread width of spray water in the conveying direction "B" and the intervals of the installed spray nozzles "P" might satisfy the expression "$2B=P$" and under this condition prepared so that the relation between the spread width of spray water in the conveying direction "B" and the intervals of the installed spray nozzles "P" might satisfy the expression "$B \leq P$" and the relation between the spraying time and the spray stopping time might satisfy the expression "$1.2 \times T1+T2$". The continuous cooling of the comparative examples was performed under the condition of "$B \geq P$".

FIG. 6 shows the relationship between the temperature at the center of a reduced-iron agglomerate during cooling and a spray water amount. It is understood that the intermittent cooling of the invention example is excellent in cooling effect in comparison with the continuous cooling of the comparative example.

By the present invention, the temperature at the center of the reduced-iron agglomerate is lowered to preferably not higher than 300° C., as shown by the solid line, and still more preferably not higher than 200° C., as shown by the broken line.

Further, whereas, in the case of the intermittent cooling of the invention example, the temperature is 300° C. or lower when the relative spray water amount is 0.7 or more, in the case of the continuous cooling of the comparative example, the relative spray water amount of 2.0 is required.

FIG. 7 shows the relationship between a spray water amount and a water content after cooling. In the case of the intermittent cooling according to the present invention, it is possible to regulate the water content of a reduced-iron agglomerate by the spray water amount. A preferable water content is not more than 6% as shown by the solid line and still more preferably not more than 5%, as shown by the broken line.

In the case of the intermittent cooling of the invention example, the water content is 6% or less when the relative spray water amount is 1.3 or less and the temperature is 300° C. or lower and the water content is 6% or less when the relative spray water amount is in the range from 0.7 to 1.3. On the other hand, in the case of the continuous cooling of the comparative example, the water content exceeds 6% when the temperature is controlled to 300° C. or lower.

FIG. 8 is a graph obtained by putting FIGS. 6 and 7 together and shows the relationship between the temperature at the center of a reduced-iron agglomerate and the water content thereof. In the case of the continuous cooling of the comparative example, the water content exceeds 6% when the temperature at the center of the reduced-iron agglomerate is lowered to 300° C. or lower and the temperature at the center exceeds 300° C. when the water content is controlled to 6% or less.

In contrast, in the case of the intermittent cooling of the invention example, as shown by the solid line, the temperature at the center and the water content can be regulated to 300° C. or lower and 6% or less respectively and a good reduced-iron agglomerate can be obtained.

Figure 19:
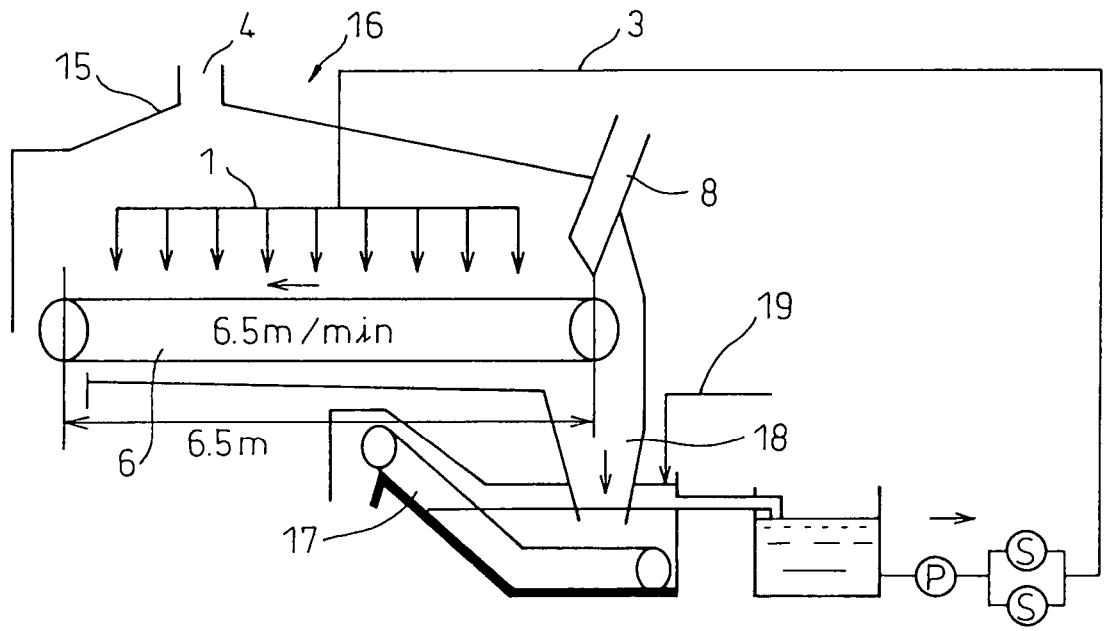
FIG. 19 is a view showing another cooling apparatus according to the present invention.

2) Another present invention is further explained on the basis of the cooling apparatus shown in FIG. 19.

The technological concept of the present invention is explained hereunder.

Spray nozzles are arranged above a cooling conveyer along the conveying direction and a reduced-iron agglomerate is cooled with water sprayed from above. However, the bottom surface and the center portion of the reduced-iron agglomerate are hardly cooled with only the cooling from above.

Therefore, the temperature difference appears between the top and bottom surfaces of the reduced-iron agglomerate and, when a spray water amount is insufficient, the heat at the bottom surface is transferred after cooling and the cooling becomes insufficient.

On the other hand, when a spray water amount is abundant, water penetrates the top surface of a low temperature and the water content increases.

In this light, with intent to achieve both "cooling to a temperature of 300° C. or lower at the center" and "a water content of 6% or less" at the same time, the method is used wherein a reduced-iron agglomerate is cooled from the top and bottom surfaces by raising both the side portions of a conveyer and accumulating cooling water so as to form a water layer 1 mm to less than 10 mm on the conveyer.

When water accumulates so as to form a water layer 1 to less than 10 mm (which corresponds to less than a half of the thickness of a reduced-iron agglomerate) at the bottom of a conveyer by raising both the side portions of the conveyer, the bottom surface of the reduced-iron agglomerate is cooled by the heat of the evaporation of water and the temperature difference between the top and bottom surfaces decreases. Therefore, both "cooling to a temperature of 300° C. or lower at the center" and "a water content of 6% or less" can be achieved at the same time.

When a water layer at the bottom of a conveyer is less than 1 mm in thickness, the ability to cool the reduced-iron agglomerate is insufficient. On the other hand, when it is 10 mm or more in thickness, a water content increases excessively. For that reason, the thickness of a water layer is determined to be in the range from 1 mm to less than 10 mm.

With regard to a method of spraying cooling water on a reduced-iron agglomerate through spray nozzles installed above a conveyer, the cooling water may be sprayed intermittently, instead of continuously, on the reduced-iron agglomerate. By this intermittent cooling, it becomes possible to cool a reduced-iron agglomerate to a uniform temperature from the surface to the center. The method of intermittent spraying is not particularly specified and it is preferable to repeat spraying and non-spraying during the course of cooling by adjusting the arrangement and the spread angle of spray nozzles.

Figure 20:
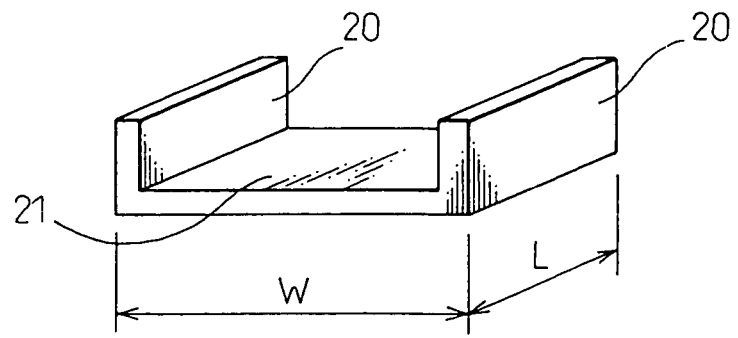
FIG. 20 is a view showing the structure of a cooling conveyer.

The present invention is explained on the basis of FIGS. 19 and 20.

FIG. 19 shows the overall view of a cooling apparatus according to the present invention.

A high-temperature reduced-iron agglomerate is discharged from the outlet 8 of a rotary hearth of a reduced-iron production equipment and loaded on a cooling conveyer 6. The temperature of the reduced-iron agglomerate discharged from the outlet 8 of the rotary hearth is 1,000° C. Spray nozzles 1 are installed above the cooling conveyer 6 and cooling water is sprayed on the reduced-iron agglomerate on the cooling conveyer 6 through the spray nozzles 1.

In such a cooling apparatus, when the length of the cooling conveyer 6 is set at 6.5 m and the conveying speed at 6.5 m/min., the reduced-iron agglomerate is cooled for about 1 min. In the meantime, the reduced-iron agglomerate is cooled from about 1,000° C. to 300° C. or lower.

The cooled reduced-iron agglomerate is conveyed from the end of the cooling conveyer 6 as a product. Further, sludge formed during the course of cooling is separated from water at a shoot 18, thereafter recovered with a sludge recovery conveyer 17, and reused as an iron source. Here, vapor generated during the course of cooling is discharged outside through a vapor duct 4.

FIG. 20 shows the structure of a cooling conveyer 6. "W" in the FIG. 20 shows the width direction of the cooling conveyer 6 and "L" the length direction thereof. FIG. 20 shows a pallet of the cooling conveyer 6 and the cooling conveyer 6 is composed of a series of the pallets in the length direction.

Such side walls as shown in FIG. 20 are placed at both the sides of the cooling conveyer 6 and the structure is configured so that cooling water sprayed through spray nozzles 1 may not fall down from the sides of the cooling conveyer 6. Accordingly, a water layer 1 mm to not more than 10 mm, in depth, can accumulate at the bottom of the cooling conveyer 6.

Further, the bottom plate 21 of the cooling conveyer 6 is made of a steel plate and the structure is configured so that the cooling water may not fall down from the bottom plate 21.

EXAMPLES

Figure 21:
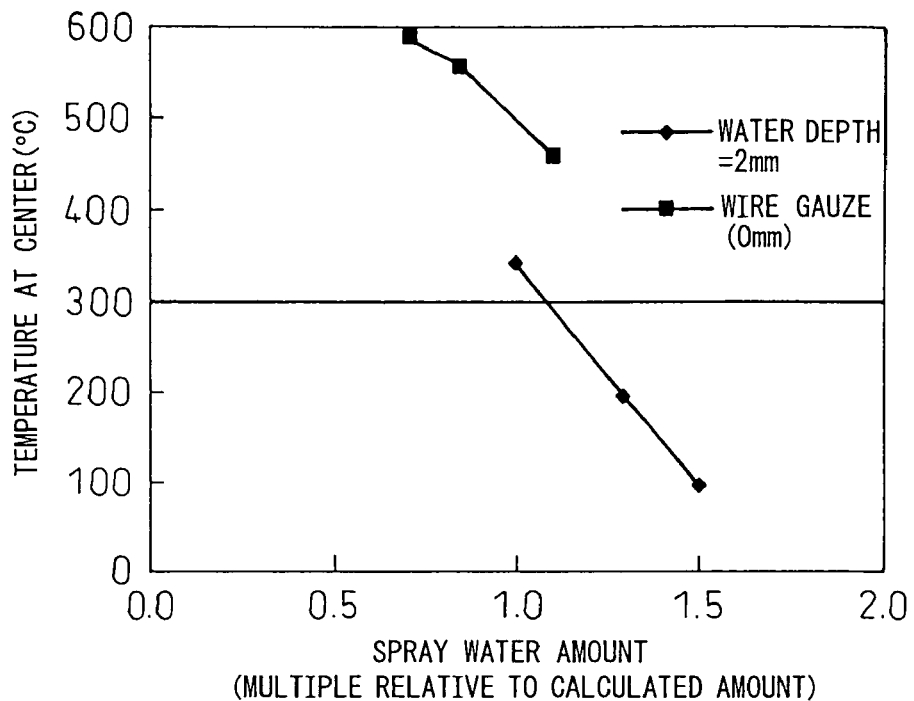
FIG. 21 is a graph showing the relationship between the spray amount of cooling water and the temperature at the center of a reduced-iron agglomerate.
Figure 22:
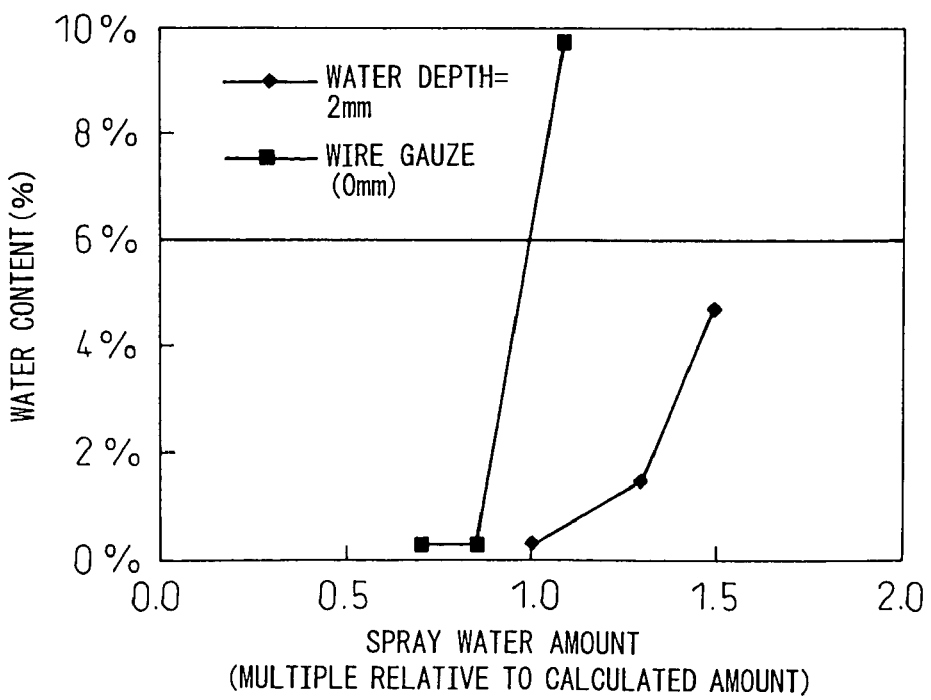
FIG. 22 is a graph showing the relationship between the spray amount of cooling water and the water content of a reduced-iron agglomerate.

The results of the examples according to the present invention are shown in FIGS. 21 and 22.

FIG. 21 is a graph showing the relationship between the spray amount of cooling water and the temperature at the center of a reduced-iron agglomerate. The line indicated as the water depth of 2 mm represents the case where the bottom plate 21 of the cooling conveyer 6 is made of a steel plate and the line indicated as wire gauze (0 mm) represents the case where the bottom plate of the cooling conveyer 6 is made of wire gauze. A spray water amount is expressed by a relative value obtained by regarding the calculated spray water amount required for cooling as 1.0.

As shown in FIG. 21, according to this example, in the case of using a steel plate as the bottom plate of the cooling conveyer 6 and forming a water layer 2 mm in depth, the temperature at the center of a reduced-iron agglomerate can be lowered to 300° C. or lower when the spray water amount is about 1.1 times the calculated required amount.

On the other hand, in the case of using wire gauze as the bottom plate of the cooling conveyer 6, the temperature at the center of a reduced-iron agglomerate can be lowered only to 470° C. even when the spray water amount is about 1.1 times the calculated required amount.

FIG. 22 is a graph showing the relationship between the spray amount of cooling water and the water content of a reduced-iron agglomerate. The viewpoint of the figure is the same as that of FIG. 21.

As shown in FIG. 22, according to this example, in the case of using a steel plate as the bottom plate of the cooling conveyer 6 and forming a water layer 2 mm in depth, the water content can be suppressed to 6% or less even when the spray water amount is increased to 1.5 times the calculated required amount.

On the other hand, in the case of using wire gauze as the bottom plate of the cooling conveyer 6, the water content exceeds 6% when the spray water amount exceeds the calculated required amount.

From the results shown in FIGS. 21 and 22, it can be understood that it becomes possible that a temperature at the center of a reduced-iron agglomerate is 300° C. or lower and a water content is 6% or less by raising both the side portions of a cooling conveyer 6, using a steel plate as the bottom plate of the cooling conveyer 6 and forming a water layer 2 mm in depth.

INDUSTRIAL APPLICABILITY

By a method and an apparatus according to the present invention, it is possible to cool a high-temperature reduced-iron agglomerate intermittently, to cool it effectively to a temperature in the range from 100° C. to 300° C. at a breath and, as a result, to suppress the reoxidation caused by the atmospheric air.

Further, it is possible to regulate the water content of a cooled reduced-iron agglomerate to 6% or lower, to eliminate the danger of a water-vapor explosion at the time when the reduced-iron agglomerate is charged into molten metal, and also to suppress the energy required for melting.

Further, the present invention makes it possible to reduce a water content to 6% or less in comparison with an immersion cooling method and therefore to suppress the pulverization and the reoxidation. Furthermore, by the present invention, a conveyer itself is also cooled and, therefore, the durability of the conveyer is improved.

The invention claimed is:

1. A method for cooling a reduced-iron agglomerate in a reduced-iron agglomerate production equipment wherein an iron oxide agglomerate is reduced in a reducing furnace and discharged as a reduced-iron agglomerate characterized by:

installing a conveyor to convey said reduced-iron agglomerate at the outlet of said reduced-iron agglomerate production equipment;

installing a plurality of spray nozzles above said conveyor at intervals (P) satisfying the expression $1.2 \times B \leq P \leq 10 \times B$, where B is the spread width of spray water in the conveying direction, so that spread widths of spray water in the conveying direction of said reduced-iron agglomerate do not overlap with each other;

setting the spread width of spray water in the conveying direction B and the spread width thereof in the conveyor width direction W satisfying the expression: $W \geq 2 \times B$, where W is the spread width of spray water in the conveyor width direction and B is the spread width of spray water in the conveying direction;

cooling said reduced iron agglomerate on said conveyor intermittently by ejecting cooling water intermittently through said spray nozzles so that an ejecting time T1 and an ejection stopping time T2 satisfy the following expression:

$$1.2 \times T1 \leq T1 + T2 \leq 10 \times T1;$$

where T1 is an ejecting time and T2 an ejection stopping time;

to lower a surface temperature by repeated cycles of rising and lowering of the surface temperature of said reduced-iron agglomerate;

providing side portions arranged on said conveyor, said side portions accumulating said cooling water and forming a water layer 1 mm to less than 10 mm in depth on said conveyor;

said cooling of said reduced-iron agglomerate being a rapid cooling to a temperature range of 100° C. to 300° C. thereby suppressing reoxidation by atmospheric air;

regulating water content of said reduced-iron agglomerate after cooling to 6% or less.

* * * * *

UNITED STATES PATENT AND TRADEMARK OFFICE
CERTIFICATE OF CORRECTION

PATENT NO. : 7,618,476 B2
APPLICATION NO. : 10/489996
DATED : November 17, 2009
INVENTOR(S) : Ichikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 83 days.

Signed and Sealed this

Twenty-sixth Day of October, 2010

David J. Kappos
*Director of the United States Patent and Trademark Office*